(12) United States Patent
Cummings

(10) Patent No.: US 9,423,996 B2
(45) Date of Patent: Aug. 23, 2016

(54) VEHICLE NAVIGATION USER INTERFACE CUSTOMIZATION METHODS

(76) Inventor: Ian Cummings, Ypsilanti, MI (US)

( * ) Notice: Subject to any disclaimer, the term of this patent is extended or adjusted under 35 U.S.C. 154(b) by 1167 days.

(21) Appl. No.: 12/114,216

(22) Filed: May 2, 2008

(65) Prior Publication Data

US 2008/0275632 A1 Nov. 6, 2008

Related U.S. Application Data

(60) Provisional application No. 60/915,776, filed on May 3, 2007, provisional application No. 60/915,774, filed on May 3, 2007.

(51) Int. Cl.
| | |
|---|---|
| *G01C 21/36* | (2006.01) |
| *G06F 3/0481* | (2013.01) |
| *G10L 15/26* | (2006.01) |
| *B60R 25/04* | (2013.01) |
| *G06F 3/16* | (2006.01) |
| *G06F 9/44* | (2006.01) |

(52) U.S. Cl.
CPC ...... *G06F 3/16* (2013.01); *G01C 21/36* (2013.01); *G06F 3/0481* (2013.01); *G06F 9/4443* (2013.01)

(58) Field of Classification Search
CPC ........ G01C 21/36; G01C 21/26; G01C 21/20; H04L 29/06; H04L 65/4084; G06F 17/30749; G06F 3/0237; G06F 17/30884; G06F 1/1626; G06F 3/0481; G06F 17/3097; G06F 8/60; G06F 3/16; G06F 17/248; G10L 15/265; G10L 15/22; G10L 15/32; H04M 1/6091; H04M 1/72563; G08G 1/09675; B60R 25/04
USPC .......... 701/200, 201, 208, 517, 532, 533, 36; 715/810, 853, 854, 248, 838; 345/173; 707/3, 4; 704/236, 275, 246; 709/217; 455/569.2; 348/157; 725/81, 39; 713/1; 340/426.12
See application file for complete search history.

(56) References Cited

U.S. PATENT DOCUMENTS

| | | |
|---|---|---|
| 5,995,928 A | 11/1999 | Nguyen et al. |
| 6,347,278 B2 | 2/2002 | Ito |
| 6,405,172 B1 | 6/2002 | Baker et al. |
| 6,434,478 B1 * | 8/2002 | Ikeda ............................ 701/533 |

(Continued)

FOREIGN PATENT DOCUMENTS

EP 1829339 A1 * 9/2007 ............ H04M 1/247

*Primary Examiner* — Yuri Kan
(74) *Attorney, Agent, or Firm* — Dinsmore & Shohl LLP

(57) ABSTRACT

Apparatus and methods are directed to the use and customization of user interfaces associated with vehicle navigation systems, including "skins," selection of context for clarification, and autocompletion functions. The navigator may be a wireless client server navigation system comprising mobile clients used for requesting and receiving guidance from a central server that houses databases of geographical information. Customization may include images, icons, controls, menus, colors, symbols, or shapes that are added, removed, or moved on the display. Options may be selected using equipment external to the navigation system. If a word, or phrase is not understood, the method proceeds with the steps of: searching a database for potential matching letters, words, or phrases; querying the user with the potential matching words, or phrases; and, if the user selects one of the potential matching words, or phrases: performing an operating associated with the potential matching words, or phrases.

16 Claims, 3 Drawing Sheets

(56) References Cited

U.S. PATENT DOCUMENTS

| | | | |
|---|---|---|---|
| 6,687,673 B2* | 2/2004 | Mann | 704/244 |
| 7,323,970 B1* | 1/2008 | Murray | B60R 25/04 340/426.11 |
| 7,555,713 B2* | 6/2009 | Yang | G06F 17/248 434/178 |
| 7,793,228 B2* | 9/2010 | Mansfield et al. | 715/780 |
| 8,339,362 B2* | 12/2012 | O'Brien et al. | 345/157 |
| 2002/0010579 A1* | 1/2002 | Kitaoka et al. | 704/231 |
| 2002/0060701 A1* | 5/2002 | Naughton | H04L 29/06 715/853 |
| 2002/0112237 A1* | 8/2002 | Kelts | G06F 3/0481 725/39 |
| 2002/0122073 A1* | 9/2002 | Abrams | G06F 17/30884 715/838 |
| 2003/0014261 A1* | 1/2003 | Kageyama | G10L 15/26 704/275 |
| 2004/0204822 A1* | 10/2004 | Kohno et al. | 701/200 |
| 2005/0021935 A1* | 1/2005 | Schillings | G06F 8/60 713/1 |
| 2005/0159957 A1* | 7/2005 | Roth et al. | 704/276 |
| 2006/0190170 A1* | 8/2006 | Piekarz | 701/211 |
| 2006/0190256 A1* | 8/2006 | Stephanick et al. | 704/252 |
| 2006/0200347 A1* | 9/2006 | Kim et al. | 704/236 |
| 2006/0229778 A1* | 10/2006 | Obradovich et al. | 701/33 |
| 2006/0274051 A1* | 12/2006 | Longe | G06F 3/0237 345/173 |
| 2007/0005206 A1* | 1/2007 | Zhang | G06F 3/16 701/36 |
| 2007/0136060 A1* | 6/2007 | Hennecke et al. | 704/251 |
| 2007/0152978 A1* | 7/2007 | Kocienda et al. | 345/173 |
| 2007/0233376 A1* | 10/2007 | Gershony et al. | 701/211 |
| 2007/0240190 A1* | 10/2007 | Arseneau et al. | 725/81 |
| 2007/0250492 A1* | 10/2007 | Angel et al. | 707/4 |
| 2007/0250842 A1* | 10/2007 | Pinkus et al. | 719/328 |
| 2008/0071536 A1* | 3/2008 | Nagashima | G10L 15/32 704/246 |
| 2008/0109404 A1* | 5/2008 | Holm | G06F 17/30749 |
| 2008/0134088 A1* | 6/2008 | Tse et al. | 715/810 |
| 2008/0167801 A1* | 7/2008 | Geelen | G01C 21/3641 701/533 |
| 2008/0201667 A1* | 8/2008 | Drayer | G06F 3/0481 715/854 |
| 2008/0215234 A1* | 9/2008 | Geelen | G01C 21/36 701/532 |

* cited by examiner

VEHICLE NAVIGATION USER INTERFACE CUSTOMIZATION METHODS

REFERENCE TO RELATED APPLICATIONS

This application claims priority from U.S. Provisional Patent Application Ser. Nos. 60/915,776 and 60/915,774, both filed May 3, 2007, the entire content of each application is incorporated herein by reference.

FIELD OF THE INVENTION

This invention relates generally to navigation systems and, in particular, to the user interface associated with such systems.

BACKGROUND OF THE INVENTION

One of the challenges of GPS navigators is the difficulty of controlling the devices in a vehicle. Navigators typically have a much smaller screen than users are accustomed to in their computers, and lack control devices such as a keyboard or mouse. Due to the automotive environment in which they are used, such control devices are difficult to position and use. While innovations have been made to improve ease of use, this is still considered one of the greatest barriers to increased adoption of navigators.

SUMMARY OF THE INVENTION

This invention is directed to the use and customization of user interfaces associated with vehicle navigation systems. According to one embodiment, the user interface of a navigator is customizable to user preferences. Aspects of this customizability include selection of interface "skins," selection of context for clarification, and autocompletion functions. The navigator may be a wireless client server navigation system comprising mobile clients used for requesting and receiving guidance from a central server that houses databases of geographical information.

In broad and general terms, a method of customizing a vehicle navigation system, comprising the steps of displaying options to a user relating to the appearance, control or use of the navigator; selecting, by the user, one or more of the options; and storing the selections for later use. The options to be customized may include images, icons, controls, menus, colors, symbols, or shapes that are added, removed, or moved on the display. The options may be selected using equipment external to the navigation system; for example, the options may be selected using a computer connected to the Internet.

The options may also be entered by way of a spoken command. If a letter, word, or phrase received by the navigator is not understood, the method proceeds with the steps of: searching a database for potential matching letters, words, or phrases; querying the user with the potential matching letters, words, or phrases; and, if the user selects one of the potential matching letters, words, or phrases: performing an operating associated with the potential matching letters, words, or phrases.

One method of controlling a vehicle navigation system in accord with the invention comprises the steps of: receiving a verbal input; determining possible text meanings of the verbal input; presenting the possible meanings to a user; and user-selecting at least one of the possible meanings presented. The possible meanings may be ranked, and the most highly ranked possibilities are given prominence in presentation through color or other graphical representations. The user-selections may be made via a touchscreen or verbally.

As with other embodiments, the navigation system may be a wireless client server navigation system comprising mobile clients used for requesting and receiving guidance from a central server that houses databases of geographical information. Particularly in this embodiment, a database on the server may be consulted for the possible meanings. Heuristics may be applied to rank possible meanings, and the context of the user input may be considered in determining and/or ranking possible meanings. The user may specify the context of the user input.

DETAILED DESCRIPTION OF THE INVENTION

This invention broadly makes a vehicular navigation system easier to use by allowing a user to customize the user interface.

A first embodiment of this invention provides a user with the ability to design and/or choose from among different "skins" for navigator. A "skin" in user interface design means a particular appearance and set of options for a user interface. For example, a navigator might have an "ocean" skin where control colors are in blue and green and controls appear to be bubbles, or a "jungle" skin where the controls appear as trees and are activated by pulling on vines in some fashion. Skins may also offer different controls. As an example, a commuter and a truck driver would want different controls to be readily available and would choose different skins. Skins can include images, color schemes, controls, icons, and informational displays, and controls.

Figure 1:
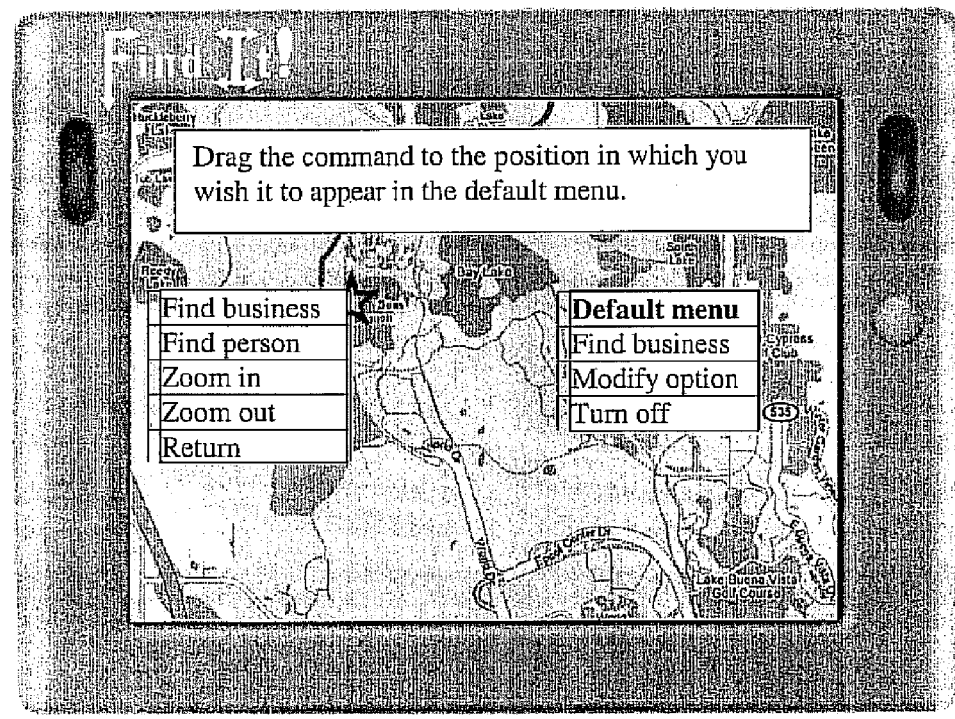
FIG. 1 show a navigator interface in the process of being configured.

FIG. 1 shows a user configuring an interface according to the invention. In this particular embodiment, desired commands are dragged into position as the user wishes them to appear in the default menu used for customization purposes.

Since designing a user interface on a navigator can be challenging, it is advantageous to allow users to design an interface on their computer then transfer the interface design to their navigator. This method is accommodated through the use of a wireless client-server (WCS) navigator, which can be described as a system to aid a user in navigating by providing guidance made up of maps, routes, and/or instructions, and 1) which has mobile clients used for requesting and receiving guidance,
2) which has a central server that houses databases of geographical information, and generates guidance, and
3) in which data is transmitted between the mobile clients and central server.

In a WCS navigation system, a user interface skin can be designed or chosen by a user working at a computer, allowing the skin to be transferred to the WCS navigator server and then to the client device in a convenient manner.

Another embodiment of the invention assists in clarifying verbal inputs such as spoken commands. The navigator interprets letters, words, and/or phrases spoken by the user as directives and performs actions based on received audible input. While voice recognition technology is progressing rapidly, problems still arise when voice recognition software cannot distinguish between several similar-sounding words.

In this case it is useful for a navigator to query the user as to which of several options the user meant.

In the event that a letter, word, or phrase received by the navigator is not understood, the navigator searches a database of sounds it can understand for similarly sounding letters words, or phrases. The navigator then queries the user if the similar sounds from the database are the sounds intended by the user. If the user indicates that they are, then the navigator acts on the instructions.

In order to communicate a word to the navigator that is not found in the database of understood sounds, the user may verbally spell the word. The navigator compares the letters it has received to words in a database and visually displays words that may match the word the user is in the process of spelling. The most likely match may be visually differentiated from other possible matches in some way. Letters received may be visually differentiated from letters in suggested words that have not been received. The user may indicate audibly that the displayed most likely match is correct. The user may also indicate by use of a control that another one of the possible matches is the word intended. When the user indicates that a word is the one he intended, the navigator accepts the word as an input.

This aspect of the invention is of particular use in WCS navigators, though is not limited in that respect. However, when used with a WCS navigator, a client may query the server as to possible matches for a word not understood or for candidates for word completion by sending either a voice recording or data representing the content of the voice to the server. The server will then respond to candidate alternate word or candidate completion words, as appropriate.

In both word completion and searching for alternative words and letters, heuristics ay be applied to prioritize words most commonly used by the general population or words most commonly used by the specific user.

The invention further considers the context of the user input when considering which options to present and which options to present most prominently. For example, in the context of an address, a word that sounds like "core" is probably "court," while in searching for an agricultural feed store, a word that sounds like "core" is probably "corn." For this reason, the invention includes user specification of the context of queries.

A similar application applies to verbally spelling out words for the navigator. Uncommon words must commonly be spelled out in verbally communicating with a navigator. The invention therefore accommodates an autocompletion function, where choices are displayed that logically complete a word a user has started are useful in these cases to speed up entry. In this case again it is useful to consider the context of the entry in determining which completions to suggest and which completions to suggest most prominently. It is also useful in this case to allow a user to determine the context of an autocompletion.

Both the clarification and autocompletion applications benefit from operating on a WCS navigator platform in that a WCS navigator's databases are much larger than those of a stand-alone navigator, allowing a greater number of suggestions to be considered.

Figure 2:
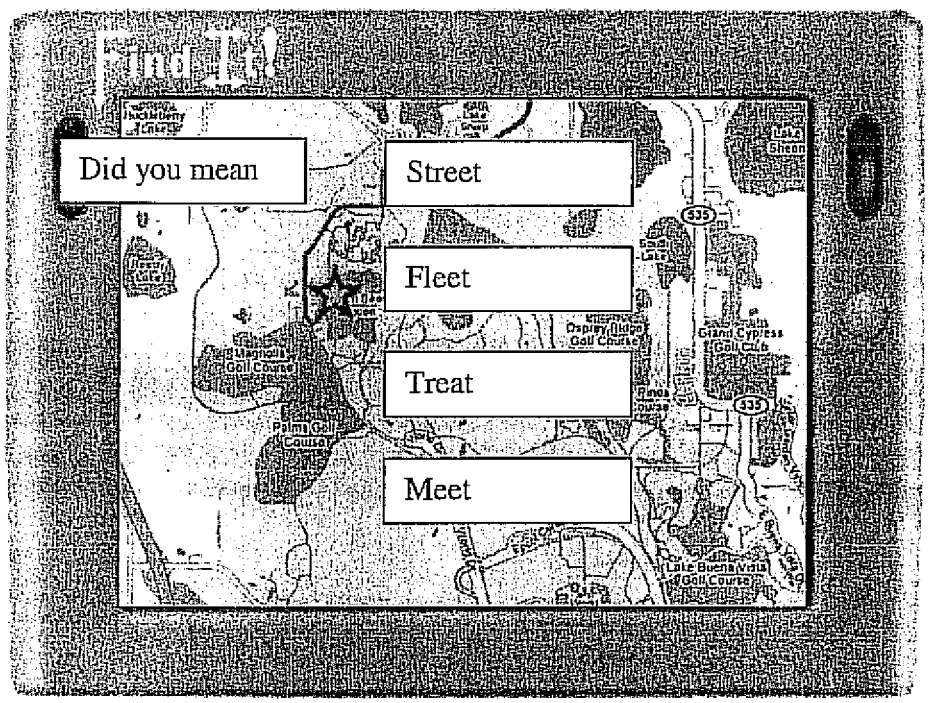
FIG. 2 illustrates a clarification application.
Figure 3:
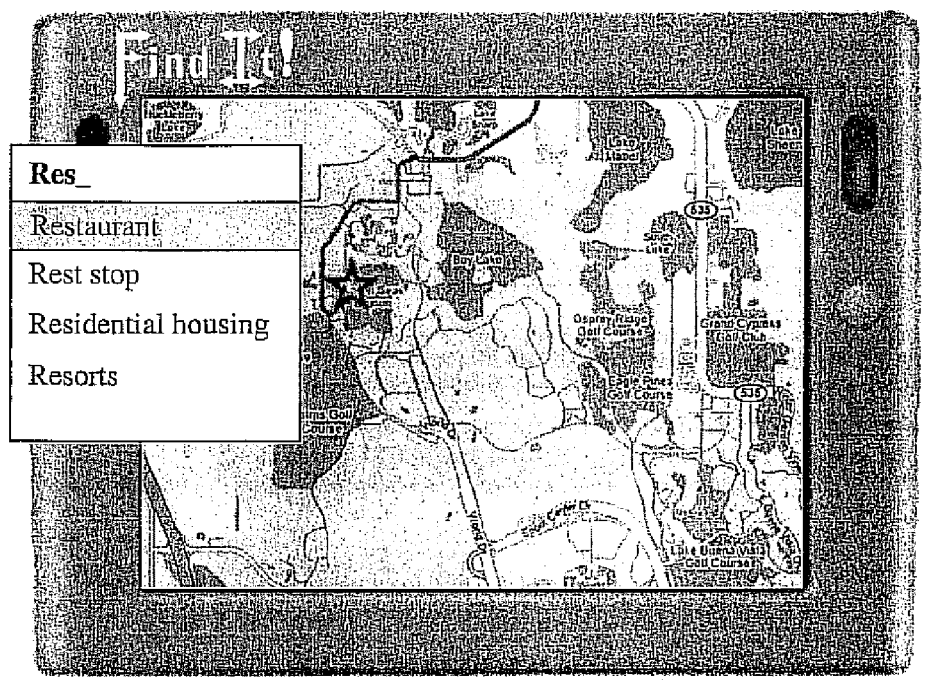
FIG. 3 illustrates an autocompletion function.

With reference to the drawings, FIG. 2 is a drawing which shows that a user has requested a route on Davis Street, but a car horn obscured the word "Street." The navigator is offering possible matches. In FIG. 3, a user is requesting the location of a salon by spelling out "restaurant." The navigator is offering possible matches so that he does not have to spell all of the word. The use has already said "R," "E," and "S."

I claim:

1. A method controlling a vehicle navigation system having a user interface, comprising the steps of:
    providing a vehicle navigation system having a display with a user interface;
    accessing an external system remotely located from the vehicle navigation system;
    displaying, on the external system, options relating to the appearance, control or use of the user interface of the vehicle navigation system;
    selecting, by a user of the external system, one or more of the options relating to the appearance, control or use of the user interface of the vehicle navigation system;
    transmitting, from the external system to the vehicle navigation system, information regarding the selection of one or more of the options made by the user; and
    storing information regarding the selection in the navigation system for later use.

2. The method of claim 1, wherein the options include images, icons, controls or menus that are added, removed, or moved on the display of the vehicle navigation system.

3. The method of claim 1, wherein the options include colors, symbols, or shapes that are added, removed, or moved on the display of the vehicle navigation system.

4. The method of claim 1, wherein the external system remotely located from the vehicle navigation system is a computer connected to the Internet.

5. The method of claim 1, wherein the navigator is a wireless client server navigation system comprising mobile clients used for requesting and receiving guidance from a central server that houses databases of geographical information.

6. A method controlling a vehicle navigation system, comprising the steps of:
    providing a vehicle navigation system having a display screen presenting maps, routes or instructions relating to vehicle guidance;
    receiving a verbal input from a user of the vehicle navigation system, the verbal input relating to the appearance, control or use of the navigation system;
    using phoneme similarities associated with the verbal input to determine multiple possible text meanings of the verbal input;
    presenting the multiple possible text meanings to a user; and
    user-selecting at least one of the possible meanings presented.

7. The method of claim 6, wherein the possible meanings are ranked by the system in conjunction with the step of presenting them.

8. The method of claim 7, wherein the most highly ranked possibilities are given prominence in presentation on the display screen.

9. The method of claim 8, wherein prominence is differentiated through color on the display screen.

10. The method of claim 6, wherein:
    the display screen is a touchscreen; and
    the user-selection is made via a touchscreen.

11. The method of claim 6, wherein the user-selection is made verbally.

12. The method of claim 6, wherein the navigation system is a wireless client server navigation system comprising mobile clients used for requesting and receiving guidance from a central server that houses databases of geographical information.

13. The method of claim 12, wherein a database on the server is consulted for the possible meanings.

14. The method of claim 6, wherein heuristics are applied to ranking possible meanings.

15. The method of claim 6, wherein the context of the user input is considered in determining and/or ranking possible meanings.

16. The method of claim 15, wherein the user specifies the context of the user input.

\* \* \* \* \*